Patented Oct. 30, 1951

2,573,051

UNITED STATES PATENT OFFICE 2,573,051

ART OF MAKING LUMINESCENT SCREENS

Serge Pakswer, Elmhurst, and Adolph W. Schmidt, Chicago, Ill., assignors to The Rauland Corporation, a corporation of Illinois No Drawing. Application October 7, 1949, Serial No. 120,219

17 Claims. (Cl. 117—33.5)

This invention relates to improvements in the art of depositing luminescent material on a solid surface to form a luminescent screen. More specifically, the invention relates to a novel process for settling luminescent screen material on a solid surface, and to a novel material useful in carrying out the improved process.

One widely accepted method of depositing luminescent material on a solid surface, such as the end wall of a cathode-ray tube envelope or the like, is the so-called settling process. In particular, one prior art method of forming a luminescent screen of substantially uniform thickness comprises distributing pulverulent luminescent screen material over the surface of an aqueous colloidal silica suspension, termed a cushion fluid, and allowing the luminescent material to settle through the suspension onto the supporting surface. Some of the colloidal silica is also deposited and serves to bind the luminescent particles to the screen support. The excess suspension is then decanted or otherwise removed after allowing sufficient time for the luminescent particles to set on the supporting surface.

One of the disadvantages inherent in the use of a pure aqueous colloidal silica suspension as the so-called cushion fluid resides in the fact that, in order to avoid avalanching of the deposited luminescent particles during the decanting process, the deposited particles must be allowed to set for a prolonged period of time, of the order of several hours. It has been found, however, in accordance with the prior art, that the required setting time may be accelerated by incorporating an electrolyte in the cushion suspension. The action of the electrolyte is to accelerate the gelling time of the colloidal silica, thereby allowing the deposited particles to adhere to the screen support in a relatively short time, of the order of one-half hour or less. In particular, it has been found desirable in accordance with the prior art to utilize inorganic ammonium compounds in solution with the cushion suspension for this purpose, and such compounds as ammonium carbonate, ammonium sulfate, ammonium chloride, and the like have been used with particular success.

There is, however, a very serious disadvantage inherent in the use of ammonium compounds to accelerate the setting time of the deposited screen particles, particularly if the luminescent material is composed of zinc sulfide, zinc-cadmium sulfide and other similar materials predominantly used at present in television viewing tubes and the like. It has been observed that, whenever such ammonium compounds are utilized in the cushion fluid, the finished screen is characterized by a number of blue spots, each having a dark nucleus, a greenish zone around the nucleus, and a blue tail. The presence of these spots detracts from the quality of the screen in reproducing picture images. As a result, in applications requiring high quality uniform luminescent screens, such as cathode-ray tubes and the like, the use of ammonium compounds to accelerate the setting time has been avoided.

It is a primary object of the present invention to provide an improved settling process for forming a luminescent screen on a support surface to be coated.

It is a further object of the invention to provide a novel and improved fast settling process for forming a luminescent screen on a support surface.

Another object of the invention is to provide an improved process for forming a luminescent screen on a support surface, in which ammonium compounds are used to accelerate the setting time while at the same time avoiding the formation of undesirable blue spots in the finished screen.

Yet another object of the invention is to provide an improved fast settling process for forming a luminescent screen of high quality and uniformity on a support surface.

A further object of the invention is to provide a novel and improved cushion fluid for use in settling a luminescent screen on a support surface.

In accordance with the present invention, the process of forming a luminescent screen on a support surface to be coated comprises forming a colloidal silica suspension in an aqueous solution containing ammonium ions and sulfide ions in a concentration greater than .01 normal. The suspension is placed in contact with the support surface, and particles of luminescent screen material are distributed over the surface of the cushion suspension. The luminescent material is allowed to settle through the suspension and deposit upon the surface, and the excess suspension is subsequently removed from contact with the support surface.

In accordance with another feature of the invention, a cushion fluid for use in the process of settling luminescent phosphors on a support surface to be coated comprises a colloidal silica suspension in an aqueous solution containing ammonium ions and sulfide ions in a concentration greater than .01 normal.

The features of the present invention which are believed to be novel are set forth with particularity in the appended claims. The invention, together with further objects and advantages thereof, may best be understood, however, by reference to the following description.

Prior art fast-setting processes are known for forming a luminescent screen on a support surface. One particular prior art process utilizes an electrolyte in the cushion suspension to accelerate the gelling time of the colloidal silica. The colloidal silicate solution may be produced by hydrolysis of an alkaline silicate compound such as, for example, potassium silicate or sodium silicate; the pH value of an aqueous potassium silicate solution is alkaline and may have in practical cases a pH value of about pH 10.6. The mechanism by which the addition of an electrolyte to the suspension accelerates the gelling time is believed to involve a reduction of the pH value; the closer the pH value of the suspension approaches that of a neutral solution (pH 7), the more rapid the gelling time of the colloidal silica. Of course, this reduction in pH value cannot be carried too far without encountering coagulation of the suspension. Consequently, a fine control over the pH value of the suspension is highly desirable.

It has been found that the pH value of the cushion suspension may be particularly well controlled by the addition of water-soluble inorganic ammonium compounds such as ammonium sulfate, ammonium chloride, ammonium carbonate, and other compounds of ammonium with acid radicals. However, the use of these compounds has been found to result in the production of blue spots on the finished screen, as previously described. The nature of these blue spots and the reason for their formation are not well understood, although it is believed that they may be traced to slight impurities in the form of copper salts which dissolve in the ammoniacal solutions under formation of cupri-ammonium complexes; these complexes may impart a blue tint to the colloidal silica gel, or they may modify the emission characteristics of the luminescent material.

At any rate, whatever may be the explanation for the formation of blue spots when ammonium compounds are used in the cushion suspension, it has been found in accordance with the present invention that formation of such blue spots may be completely avoided by introducing, in addition to the water-soluble inorganic ammonium compound, one or more water-soluble sulfides, hydrosulfides, or polysulfides; alternatively, sulfide ions, hydrosulfide ions, or polysulfide ions may be introduced to the suspension in any other way known to the art. The mechanism by which the introduction of the sulfide, hydrosulfide, or polysulfide ions prevents the formation of blue spots apparently involves the breaking down of the cupri-ammonium complexes to insoluble copper sulfide, thereby removing the copper ions from solution.

Purely by way of illustration, and in no sense by way of limitation, one process by which a luminescent screen may be formed on a support surface in accordance with the present invention is as follows:

25 grams of chemically pure ammonium sulfate are dissolved in 1,400 cc. of water, and 1¼ grams of hydrated sodium sulfide $Na_2S.9H_2O$ is added to the ammonium sulfate solution. 100 cc. of a silica-containing material, as for example potassium silicate solution containing approximately 26% solid material, known to the trade as "Kasil," is diluted with 900 cc. of water, and 675 cc. of the resulting mixture is added to the ammonium sulfate solution. The resulting colloidal silica suspension, having a pH value of about pH 9.2, is immediately poured through a filter into a ten-inch cathode-ray tube envelope to serve as a cushion fluid. A second suspension, containing 2 grams of pulverulent luminescent material consisting of a mixture of zinc sulfide and zinc-cadmium sulfide activated with silver, ball-milled for 20 minutes in 50 cc. of water, and diluted with 30 cc. of the diluted "Kasil" solution and 70 cc. of water, is sprayed over the surface of the cushion suspension. The envelope is allowed to stand for about 15 minutes to permit the screen material to settle onto the screen support. After this length of time, the deposited screen material adheres to the screen support sufficiently well that the excess suspension may be decanted without causing avalanching of the deposited particles. The screen is then dried, washed with water, and baked at a temperature of about 350° C. for fifteen minutes for dehydration purposes.

A screen produced in accordance with the above process is smooth, uniform and is characterized by high brightness. Other sizes of cathode-ray tube envelopes may be screened in the same length of time by modifying the amounts of the suspensions and the ingredients in proportion to the volume of the envelope, in a manner well known in the art.

While the invention contemplates the addition of at least one of the group consisting of sulfide ions, hydrosulfide ions, and polysulfide ions to a cushion suspension including ammonium ions in solution, particularly good results have been obtained by using water-soluble sulfides. Furthermore, it is preferred that water-soluble sulfides of the univalent metals and/or the ammonium radical be used, as for example sodium sulfide, potassium sulfide, or ammonium sulfide, since use of a sulfide of a bivalent metal, such as strontium sulfide, may sometimes result in flocculation, and the use of a sulfide of a trivalent metal, such as aluminum sulfide, may cause an even greater tendency to flocculate. The required concentration of the added sulfide, hydrosulfide, or polysulfide is dependent upon the concentration of copper salt impurities and therefore may vary over a wide range; in general, however, it has been found that the sulfide ions should be present in a concentration of at least .01 normal, and may be present in any greater amount; it is preferred to keep the sulfide ion concentration as low as possible to avoid the formation of excess hydrogen sulfide gas. Particularly good results have been obtained by using sodium sulfide.

To obtain accelerated settling time while avoiding coagulation of the colloidal silica suspension, it is preferred that the water-soluble inorganic ammonium compounds be added in sufficient concentration to maintain the pH value of the suspension within the range from pH 7.5 to pH 10.5; optimum results are obtained by maintaining the pH value in the range from pH 8.0 to pH 9.5.

While the addition of sulfide ions, hydrosulfide ions, or polysulfide ions inhibits the formation of blue spots whenever copper salt impurities may be present in the suspension, the tendency for such blue spots to form has been found to be particularly great when the luminescent screen material includes a water-insoluble metal sulfide such as zinc sulfide or the sulfide of a zinc-cadmium complex. However, the invention is not to be limited to the use of luminescent screen material including water-insoluble metal sulfides.

Furthermore, equally good results may be obtained by adding the sulfide, hydrosulfide, or polysulfide ions to the screen material suspension rather than to the colloidal silica suspension. It is also within the scope of the invention to distribute the pulverulent screen material over the surface of the cushion suspension in a dry state, rather than by pouring or spraying a screen material suspension into the cushion fluid.

While a particular embodiment of the present invention has been described, it is apparent that various changes and modifications may be made, and it is therefore contemplated in the appended claims to cover all such changes and modifications as fall within the true spirit and scope of the invention.

We claim:

1. The process of forming a luminescent screen on a solid surface to be coated which comprises: providing a colloidal silica suspension in an aqueous solution containing ammonium ions and sulfide ions in a concentration greater than .01 normal; placing said suspension in contact with said surface; distributing particles of luminescent screen material over the surface of said suspension; allowing said material to settle through said suspension and deposit upon said solid surface; and removing excess suspension from contact with said solid surface.

2. The process of forming a luminescent screen on a solid surface to be coated which comprises: providing a colloidal silica suspension, having a pH value in the range from pH 7.5 to pH 10.5, in an aqueous solution containing ammonium ions and sulfide ions in a concentration greater than .01 normal; placing said suspension in contact with said surface; distributing particles of luminescent screen material over the surface of said suspension; allowing said material to settle through said suspension and deposit upon said solid surface; and removing excess suspension from contact with said solid surface.

3. The process of forming a luminescent screen on a solid surface to be coated which comprises: providing a colloidal silica suspension, having a pH value in the range from pH 8.0 to pH 9.5, in an aqueous solution containing ammonium ions and sulfide ions in a concentration greater than .01 normal; placing said suspension in contact with said surface; distributing particles of luminescent screen material over the surface of said suspension; allowing said material to settle through said suspension and deposit upon said solid surface; and removing excess suspension from contact with said solid surface.

4. The process of forming a luminescent screen on a solid surface to be coated which comprises: providing a colloidal silica suspension, having a pH value in the range from pH 8.0 to pH 9.5, in an aqueous solution of a water-soluble inorganic ammonium compound and a water-soluble sulfide in a concentration greater than .01 normal; placing said suspension in contact with said surface; distributing particles of luminescent screen material over the surface of said suspension; allowing said material to settle through said suspension and deposit upon said solid surface; and removing excess suspension from contact with said solid surface.

5. The process of forming a luminescent screen on a solid surface to be coated which comprises: providing a colloidal silica suspension, having a pH value in the range from pH 8.0 to pH 9.5, in an aqueous solution of potassium silicate, a water-soluble inorganic ammonium compound, and sodium sulfide; placing said suspension in contact with said surface; distributing particles of luminescent screen material over the surface of said suspension; allowing said material to settle through said suspension and deposit upon said solid surface; and removing excess suspension from contact with said solid surface.

6. The process of forming a luminescent screen on a solid surface to be coated which comprises: providing a colloidal silica suspension in an aqueous solution containing ammonium ions and sulfide ions in a concentration greater than .01 normal; placing said suspension in contact with said surface; distributing a pulverulent luminescent screen material including a water-insoluble metal sulfide over the surface of said suspension; allowing said material to settle through said suspension and deposit upon said solid surface; and removing excess suspension from contact with said solid surface.

7. The process of forming a luminescent screen on a solid surface to be coated which comprises: providing an aqueous colloidal silica suspension; providing an aqueous suspension of a pulverulent luminescent screen material; introducing ammonium ions in solution with one of said suspensions; introducing sulfide ions in a concentration greater than .01 normal in solution with one of said suspensions; placing said colloidal silica suspension in contact with said surface; distributing said screen material suspension over the surface of said colloidal silica suspension; allowing said material to settle through said colloidal silica suspension and deposit upon said solid surface; and removing excess of said suspensions from contact with said solid surface.

8. The process of forming a luminescent screen on a solid surface to be coated which comprises: providing an aqueous colloidal silica suspension; providing an aqueous suspension of a pulverulent luminescent screen material including a water-insoluble metal sulfide; introducing ammonium ions in solution with one of said suspensions; introducing sulfide ions in a concentration greater than .01 normal in solution with one of said suspensions; placing said colloidal silica suspension in contact with said surface; distributing said screen material suspension over the surface of said colloidal silica suspension; allowing said material to settle through said colloidal silica suspension and deposit upon said solid surface; and removing excess of said suspensions from contact with said solid surface.

9. The process of forming a luminescent screen on a solid surface to be coated which comprises: providing a colloidal silica suspension in an aqueous solution of a water-soluble inorganic ammonium compound and a water-soluble sulfide in a concentration greater than .01 normal; placing said suspension in contact with said surface; distributing a pulverulent luminescent screen material over the surface of said suspension; allowing said material to settle through said suspension and deposit upon said solid surface; and removing excess suspension from contact with said solid surface.

10. The process of forming a luminescent screen on a solid surface to be coated which comprises: providing a colloidal suspension of potassium silicate in an aqueous solution of a water-soluble inorganic ammonium compound and a water-soluble sulfide in a concentration greater than .01 normal; placing said suspension in contact with said surface; distributing a pulverulent luminescent screen material over the surface of said suspension; allowing said material to settle through said suspension and deposit upon said solid surface; and removing excess suspension from contact with said solid surface.

11. A cushion fluid for use in the process of settling luminescent phosphors on a surface to be coated consisting essentially of: a colloidal silica suspension in an aqueous solution containing ammonium ions and sulfide ions in a concentration greater than .01 normal.

12. A cushion fluid for use in the process of settling luminescent phosphors on a surface to be coated consisting essentially of: a colloidal silica suspension, having a pH value in the range from pH 7.5 to pH 10.5, in an aqueous solution containing ammonium ions and sulfide ions in a concentration greater than .01 normal.

13. A cushion fluid for use in the process of settling luminescent phosphors on a surface to be coated consisting essentially of: a colloidal silica suspension, having a pH value in the range from pH 8.0 to pH 9.5, in an aqueous solution containing ammonium ions and sulfide ions in a concentration greater than .01 normal.

14. A cushion fluid for use in the process of settling luminescent phosphors on a surface to be coated consisting essentially of: a colloidal silica suspension in an aqueous solution of a water-soluble inorganic ammonium compound and a water-soluble sulfide in a concentration greater than .01 normal.

15. A cushion fluid for use in the process of settling luminescent phosphors on a surface to be coated consisting essentially of: a colloidal suspension of potassium silicate in an aqueous solution of a water-soluble inorganic ammonium compound and a water-soluble sulfide in a concentration greater than .01 normal.

16. A cushion fluid for use in the process of settling luminescent phosphors on a surface to be coated consisting essentially of: a colloidal silica suspension in an aqueous solution of a water-soluble inorganic ammonium compound and sodium sulfide.

17. A cushion fluid for use in the process of settling luminescent phosphors on a surface to be coated consisting essentially of: a colloidal suspension of potassium silicate, having a pH value in the range from pH 8.0 to pH 9.5, in an aqueous solution of a water-soluble inorganic ammonium compound and sodium sulfide in a concentration greater than .01 normal.

SERGE PAKSWER.
ADOLPH W. SCHMIDT.

REFERENCES CITED

The following references are of record in the file of this patent:

UNITED STATES PATENTS

| Number | Name | Date |
| --- | --- | --- |
| 2,252,552 | Calbick et al. | Aug. 12, 1941 |
| 2,252,590 | Wolfson | Aug. 12, 1941 |
| 2,451,590 | Tidik et al. | Oct. 19 1948 |